Figure 1:
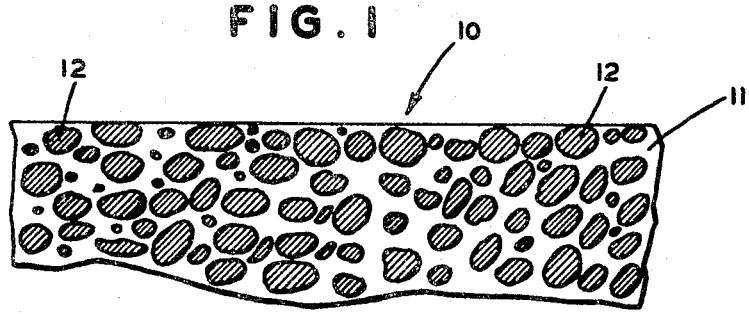

3,328,231
METHOD OF PRODUCING CAST SURFACES AND PRODUCT OBTAINED THEREBY
John A. Sergovic, Severna Park, Md., assignor to The Burns & Russell Company of Baltimore City, Baltimore, Md., a corporation of Maryland
Continuation of application Ser. No. 72,506, Nov. 29, 1960. This application Apr. 13, 1966, Ser. No. 542,368
13 Claims. (Cl. 161—162)

This application is a continuation of my copending application, Ser. No. 72,506, filed Nov. 29, 1960, now abandoned which is in turn a continuation-in-part of my copending application, Ser. No. 861,169, filed Dec. 22, 1959, now abandoned.

This invention relates to the improvement in stain resistance of a facing or surface of a hardened cured composition of a polyester or other ethylenically unsaturated polymerizable resin and sand in which the sand constitutes a major proportion of the cured composition. More particularly, this invention relates to improving the stain resistance of coated masonry building units and monolithic cast objects in which the coating or object comprises a cured composition of a polyester resin and at least about 50% by weight of sand.

There are disclosed in my prior U.S. Patent No. 2,751,775, issued June 26, 1956, novel coated masonry building units prepared by coating a masonry building block, such as those made from cinders, slag, cement, haydite, clay, or the like, with an adherent, integral, dense, hard coating made of a cured composition of a polyester resin and sand, in which the sand comprises at least 50% by weight of the coating composition. There is disclosed in the copending application of Alexander H. Russell, Ser. No. 697,505, filed Feb. 1, 1957, and issued as U.S. Patent No. 3,078,249 on Feb. 19, 1963, a process for producing monolithic cast objects from a composition comprising a polyester resin and sand, in which the sand comprises at least about 50% by weight of the cast object. Since the present invention relates to improvements in the inventions disclosed in my prior patent and in said copending application of Alexander H. Russell, it is intended to incorporate by reference the disclosures of said patent and said application in their entireties.

The coated masonry building units and monolithic cast objects disclosed in said patent and said application provide products having unique and advantageous properties. These building units and cast objects are produced in a simple, economical manner to provide a surface that is highly resistant to mechanical injuries, temperature changes, highly impervious to moisture, providing any desired surface finish, either smooth patterned or irregular, and can be provided in many different colors. These surfaces resemble those of baked ceramic finishes, yet have superior properties and can be produced at a fraction of the cost of ceramic facings. These surfaces, while resistant to staining when freshly formed by curing the polyester or other ethylenically unsaturated polymerizable resin, have been found to lose their stain resistance after aging or usage for a short period of time, at least with respect to stains from writing inks. One of the important uses for coated masonry building units produced in accordance with said patent is in the construction of interior walls of buildings used to house schools and hospitals. In construction such as this, it is important that the surface be resistant during substantially its entire life to staining by writing inks, and the like.

Accordingly, it is one object of the present invention to provide a process for improving the staining resistance of a facing or surface of a cured composition of a polyester or other ethylenically unsaturated polymerizable resin and sand, in which the sand comprises at least about 50%, and preferably at least about 65 or 70% up to about 90% by weight of the cured composition.

It is an additional object of the present invention to provide coated masonry building units and monolithic cast objects having a face or surface of a cured composition of polyester resin and sand which is highly impervious to staining, such as ink staining, during the life of the surface.

It is another object of the invention to provide a highly stain resistant surface from a cured polyester resin and a major proportion of sand.

Figure 2:
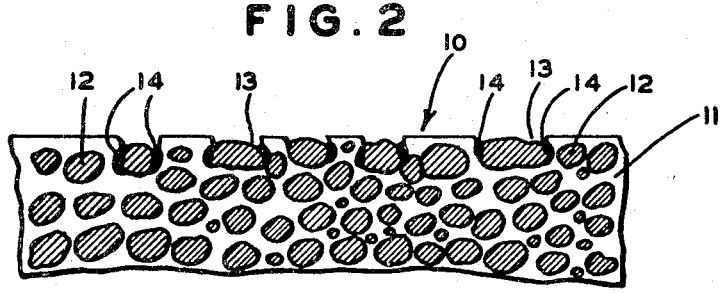

These and other objects of the invention will be better understood by reference to the present description taken in conjunction with the accompanying drawing, in which FIG. 1 is a representation of a cross-section of a surface of a cured polyester resin and sand produced in accordance with the present invention (magnified about 60 times), both immediately after curing and after a substantial period of usage. FIG. 2 is a section similar to FIG. 1 except that in producing the surface the present invention was not employed, shown shortly after curing with the formation of voids and stains on the surface.

The present invention is a result of an intensive research investigation. When it was discovered that surfaces of a cured composition of a polyester resin and a major proportion of sand in accordance with said U.S. Patent No. 2,751,775 and said copending U.S. application, Ser. No. 697,505, tended to become prone to ink staining after short periods of usage, attempts were made to resolve the staining problem by coating or painting the surfaces with various resinous or polymeric substances. Polyvinyl resins and other polymeric materials used in the coating industry were tried. However, it was discovered that these coatings tended to produce undesirable results of their own, including "crazing," cracking, and the like. In many cases they also failed to solve the staining problem.

In the course of the present research investigation, cross-sections of facings of cured polyester resin and sand were examined. It was observed that when initially formed the surface was as shown in the magnified view of FIG. 1 of the accompanying drawing in which the surface 10 was perfectly smooth and consisted of polyester resin 11, surrounding grains of sand 12. The surface was highly resistant to ink staining. After periods of exposure, it was noted that the surface 10, as shown in FIG. 2, became subject to voids 13 and when a substance, such as writing ink, was smeared across the surface of the cured polyester resin and sand, it was found to partially fill the voids as shown at 14, causing staining which could not be removed to any substantial degree, by washing or other means. This unsightly stain on the surface greatly reduces the value of the product.

From this investigation it was concluded that continuing or residual curing of a polyester resin caused the resin to shrink away from the sand grains at the surface of the casting, causing the small voids 13 to be formed between the sand grain and polyester resin over a portion of the sand particle. In most cases, the engagement of the sand grain in the polyester resin was sufficient to keep it in place. However, the voids were highly subject to staining.

In the course of the present research investigation, it was discovered that the tendency of these surfaces to form voids during residual curing of the polyester resin after substantial periods of use, could be reduced by treating the sand particles with a bonding agent having two types of reactive groups, one type of which selectively reacts with the sand particles, and the other type of which selectively reacts with the polyester or other ethylenically unsaturated polymerizable resin forming the resinous article. It was discovered that extremely small amounts of said bonding agents made it possible to bond the sand particles to the polyester resin so tightly that the polyester resin at the surface could not shrink away, as shown in FIG. 2, but retained a smooth uninterrupted surface, as shown in FIG. 1, even after long periods of use. These bonding agents may be one of several types of chemicals available commercially.

One preferred type of bonding agent having the two types of reactive groups is the alkylene silanes and siloxanes having at least one alkylene substituent and at least one substituent which will react with sand or hydroxyl groups present on the surface of sand. The preferred alkylene silanes and siloxanes are those having the formula:

$$R_xSiX_{(4-x)}$$

in which R is an unsaturated group, preferably an unsaturated hydrocarbon group, including dienyl, vinyl, chlorvinyl, bivinyl, allyl, methallyl, chlorallyl, and the like; X is a group which reacts with sand or moisture normally present in the surface of sand such as preferably chlorine or bromine, although it may be oxyaryl, oxyalkyl, amino, etc.; $x$ is a whole number from 1 to 3. Examples of these compounds are:

allyl triethoxy silane
diallyl diethoxy silane
triallyl ethoxy silane
methallyl trichloro silane
trichloroallyl chloro silane
allylphenyl dichloro silane
allylethyl dichloro silane
allylmethyl diethoxy silane
diallylmethyl ethoxy silane
allyl trichloro silane
dimethyallyl diethoxy silane
vinyl trichloro silane
divinyl dichloro silane
trivinyl monochloro silane
vinyl triethoxy silane
methyl vinyl dichloro silane and the like.

The foregoing alkylene silane compounds are employed to treat the sand prior to its incorporation with the polyester resin, since addition of the silane directly to the polyester resin does not provide to a sufficient degree the improvements made possible by the present invention.

The silane compound is used to treat the sand in amounts of from 0.1% to 2% by weight of sand, and preferably between about 0.25% and 1%, to provide satisfactory results. Amounts of below 0.1% may not provide satisfactory bonding, whereas amounts in excess of 2% are uneconomical since they produce no particular added advantage. These silanes may be used to treat the sand by simply contacting the dry sand with the silane, either in the vapor phase or as a liquid or in the form of a solution in a non-reactive solvent, such as, for example, a hydrocarbon liquid, such as benzene and toluene, or any other diluent which does not react with the reactive groups of the silane.

In the case of these unsaturated silanes, it appears that the reactive groups react with the hydroxyl groups chemically absorbed or combined on the surface of the sand grains as a result of a hydrolysis reaction whereby the silicon atom of the silane is bonded through an oxygen atom to the sand grain, leaving the unreacted, unsaturated alkylene groups, such as the vinylic and allylic groups, which are highly compatible with the polyester resin or other olefinic polymerizable materials and which are capable of chemically combining with said polyester resin or other olefinic polymerizable material. Thus the reactive halogen, oxyaryl, oxyalkyl, or amino groups react with the hydroxylic groups adherent to the sand forming one bond and the unsaturated groups, such as vinylic and allylic, react with the polyester resin or other olefinic polymerizable material forming a second bond through the intermediate silicon atom of the bonding agent. This bonding causes the cured polyester resin to be closely linked to the sand grains and prevents shrinkage of the polyester resin at the surface of the finished article.

Other types of bonding agents suitable for use in the present invention will be apparent to those skilled in the art from the present description.

Where the bonding agent is of the silane or siloxane type, it is desirable that the sand contain sufficient moisture to comprise about 0.3% by weight of sand. Preferably an amount of moisture of at least about one-sixth up to about 3 times the weight of the silane or siloxane employed is desirable, with best results being obtained at about one-third by weight of the silane or siloxane. Excessive amounts of moisture provide no particular advantage. Adjustment to the proper moisture content may be achieved by adding additional water to the sand and mixing the sand, or by drying the sand by the application of heat where it contains excessive moisture. Sands are normally dried in the course of their commercial preparation so that it is usually necessary to replace some of the moisture driven off during drying. This may be accomplished by adding sufficient liquid water to replace any excessive amounts of water driven off during drying in order to bring the moisture content to the desired value, or the moisture content may be increased by permitting the dried sand to stand exposed to the atmosphere from which the sand may sufficiently absorb moisture.

It is important that the sand contain at least about the minimum suggested amount of moisture as it appears that the moisture is necessary to provide hydrolysis of the groups of the silane which are reactive with the sand. If the moisture is not present on the surface of the sand the reaction of the silane with the sand is greatly retarded and may prevent complete reaction.

After the sand has reacted with the silane or siloxane, it is desirable next to heat the silane treated sand. Heating serves to drive the reaction of the sand with silane or siloxane to completion and thereby finish the hydrolysis reaction. By heating the treated sand to at least about 160° F. up to about 300° F., with best results being obtained at 190° F. and below about 220° F., the reaction is driven to completion. When the bonding agent is a halogenated silane, copious amounts of hydrogen chloride and chlorine will be observed being driven off from the treated sand. It has been discovered that unless the hydrogen chloride and any chlorine from the reaction are driven off, the final surface of the coated masonry building units and monolithic cast objects may tend to develop fine hairline cracks and fissures on curing and are, therefore, subject to staining. Consequently, the heating of the sand treated with halogenated silane is important if the full benefits of the invention are to be attained.

After the completion of the treatment of the sand with the bonding agent having the two different types of reactive groups, it is blended with a polyester resin composition so that the resulting blend contains at least about 50% by weight of treated sand, preferably 65 or 70%, up to about 90%, and the resulting resinous composition, containing the necessary curing agents, etc. is placed in a mold or alternatively applied to the surface of a building block after which the resinous composition is cured at any suitable temperature such as 150 to 300° F. or higher, or a lower temperature such as 190 to 220° F. when live steam is used as a source of heat. A short curing period of between about 0.5 up to 6 hours has been found to be satisfactory in most cases, although when dry heat is employed a shorter time such as ten to sixty minutes will suffice. After curing, the coated block or cast object is removed from the mold and cooled. Prolonged usage of the surface of the cured composition will not form surface voids and has excellent resistance to stains, such as ink stains.

A wide variety of resinous molding or casting compositions may be employed in the production of stain resistant surfaces of this invention. The resinous molding compositions which are most desirable include a polymerizable organic resin such as a polyester type of resin or an epon type, sand which has been treated with a bonding agent in accordance with the invention, whatever catalyst may be necessary to produce curing of the resin, a monomeric polymerizable solvent which does not volatilize when the resin is cured, and desirably a suspending material, an anti-foaming agent, and pigment or coloring material where suitable.

The polyester resins are a class of resins with which the resin chemist is familiar. These are ethylenically unsaturated alkyd resins. The preferred resins of this class for employment in the curing compositions of the invention are the polymeric ester reaction products of one or more dicarboxylic acids and one or more polyhydric alcohols. Desirably one or more of these reactants shall contain a reactive double bond or ethylenic linkage. Among the dicarboxylic acids which may be used are phthalic, malic, maleic, fumaric, adipic, pimelic, suberic, sebacic, itaconic, citraonic, and succinic acids and their anhydrides. It is essential that some of the dicarboxylic acid component of the polyester resin contain an unsaturated ethylenic linkage. For this reason, maleic and fumaric acids are most desirable. Among the polyhydric alcohols which may be used are ethylene glycol, diethylene glycol and propylene glycol. A mixture of propylene glycol and dipropylene glycol is the most satisfactory source of polyhydric alcohol. One may use an unsaturated monohydric alcohol in place of part of the polyhydric alcohol. A typical example of such an alcohol is allyl alcohol which produces an allyl ester of the dicarboxylic acid. The polyester resins may be suitably modified or plasticized by the incorporation of alcohols, fatty acids, etc., to modify the chemical and physical characteristics as desired. The polyesters should comprise upward from about 15% or 30% and preferably 50% to 85% by weight of the resin and resin forming components of the surface forming composition.

The resin component of the preferred surface forming compositions should also desirably contain a nonvolatile, monomeric, polymerizable solvent for the polyester resin or other resin employed. The function of this solvent is to make the polyester resin more fluid so that the molding composition may be more easily poured into the mold. This monomeric solvent is an important member of the resin component, for it provides the necessary fluidity to the molding composition, and is consumed during the curing of the resin without forming volatile materials. This freedom from volatility is highly important for otherwise the release of volatile matter would produce bubbles, voids or pinholes on the surface and throughout the cured product. The lack of volatile matter permits curing without requiring provision for vents, etc., in the molds. Also, escaping combustible, volatile matter might produce explosions, or fire hazards.

Among the monomeric polymerizable solvents which may be used are the hydrocarbons: styrene, vinyl toluene and cyclopentadiene; vinyl acetate; diallyl phthalate and triallyl cyanurate. Styrene has produced the most satisfactory results thus far.

When obtained commercially, the polyester resins usually also contain a small amount of a polymerization inhibitor so as to prevent gelation during storage prior to usage. Such inhibitors include the well-known anti-oxidants: hydroquinone, t-butyl catechol, quinone, etc.

Polyester resins of the character contemplated for use in the present invention are sold in the trade and identified as "Paraplex" or "Lamanac" resins. In general, these resins are unsaturated high molecular weight polymers made by reacting one or more acids or a blend of acids, such as maleic or fumaric acid, with a dihydroxy alcohol, such as ethylene glycol. The specific properties of these resins vary depending largely upon the type and amount of each constituent in the combination. For best results it is preferable to employ a mixture of two different types of such resins. Certain of these resins form masses upon curing that are very rigid or inflexible, while others form more flexible rubbery masses. It is preferred to use a mixture of the rigid and flexible resins, and about two to five parts of rigid resin and one part of flexible resin produce excellent results. These proportions may, of course, be varied within wide limits depending upon the particular properties desired for the cured cast article and the properties of the resins that are mixed.

It has been found that upon the polymerization of the blend of polyester resin component with large proportions of the monomeric polymerizable solvent component (such as styrene), the final facing or surface produced frequently tends to be exceedingly hard and inflexible and upon ageing and usage surface cracking may occur even though sand which has been treated with a bonding agent in accordance with the invention (such as silane treated sand) has been employed. While the reason for this is not presently fully understood, this tendency may result from the hardness imparted by the polymerized solvent. Polystyrene, for example, is known to provide a hard inflexible surface. Also, the use of the silane treated sand may aggregate to a certain extent this tendency of the final facing to become too hard and brittle. It has been discovered that these symptoms may be prevented by replacing up to about 20% by weight of polymerizable solvent used (such as styrene) with a mixture of tricresyl phosphate with dimethyl itaconate or ethyl acrylate. For best results the amount of tricresyl phosphate may vary from about 5% to about 15% by weight of the polymerizable solvent with the remainder comprising dimethyl itaconate or ethyl acrylate. Particularly good results are obtained by employing 5% by weight of tricresyl phosphate with 10% by weight of dimethyl itaconate or ethyl acrylate, all weights being based upon weight of polymerizable solvent, e.g., styrene. It is somewhat surprising to discover that these combinations of tricresyl phosphate with dimethyl itaconate or ethyl-itaconate or ethyl acrylate are unique in providing excellent flexibility in the cured facing. The use of any one of these materials alone does not provide optimum results. It is also surprising that these combinations of tricresyl phosphate provide excellent results, since tricresyl phosphate alone is ordinarily not a suitable plasticizer for polystyrene. Yet by using these blends with a cured mixture of polyester containing a large proportion of polystyrene, the hardened facing has excellent resistance to surface cracking. The use of these combinations of dimethyl itaconate or ethyl acrylate with tricresyl phosphate is illustrated by Examples 5 and 6 hereinbelow.

The polyester resin component, the monomeric polymerizable solvent (such as styrene or a vinyl monomer, such as vinyl acetate and vinyl toluene) and optimally, but preferably, the blend of tricresyl phosphate with dimethyl itaconate or ethyl acrylate, are mixed together along with any suspending agent, catalysts, anti-foaming agents and coloring agents to form an initial liquid resin mixture which is later to be mixed with the inert sand filler (which has previously been treated with the bonding agent having two types of reactive groups) to form the coating or molding composition. This initial liquid resin mixture shall desirably contain a ratio of about 40 parts and preferably 50 to 80 parts of polyester resin and the balance styrene or other polymerizable solvent and softening blend for each 100 parts of combined resin and styrene or other solvent. A ratio of 60 parts polyester resin and 40 parts styrene gives a good workable consistency to the initial liquid resin mixture and the final molding composition.

A suitable catalyst should be added to the initial liquid resin mixture just prior to the addition of the treated sand filler, or after the addition of the treated sand filler, but just prior to the molding operation. The molding operation should be initiated within a short period of time after the addition of the catalyst to the mixture containing the resin, otherwise the mixture may become too viscous for convenient charging of the mold as a result of premature polymerization.

A large number of oxidizing catalysts or catalysts, such as hydrogen peroxide, benzoyl peroxide and the like, with which those skilled in the resin art are familiar, may be used satisfactorily. I prefer to employ methyl ethyl ketone peroxide or benzoyl peroxide. The optimum concentration of methyl ethyl ketone peroxide is about 2% of the resin weight whereas the general practice in the art for these catalysts is the use of an amount of from 0.5% to 2%. The catalyst concentration to be used is greatly dependent upon the speed desired for curing.

The use of metallic driers in combination with the peroxide catalysts, and particularly with either benzoyl peroxide or methyl ethyl ketone peroxide, is desirable. When, for example, methyl ethyl ketone peroxide or benzoyl peroxide and manganese and cobalt naphthenates are used together in the proportions of about 1% of the peroxide and about 1½% of the naphthenates by weight of the resins, excellent results are obtained.

The metallic driers discussed above are materials with which those skilled in the art, and particularly in the paint art, are familiar. These materials are metal salts of an organic acid, such as naphthenic acid. The primarily important driers are cobalt, manganese and iron naphthenates. I prefer to use manganese naphthenate, which is desirably introduced in the form of a 6% solution, as the drier.

It has been found to be desirable to incorporate a suspending agent into the initial liquid resin mixture. The preferred suspending agents are the cation modified clays, such as are disclosed in U.S. Patent No. 2,531,427 which issued on Nov. 28, 1950 to Ernest A. Hauser. These cation modified clays are essentially clays, such as bentonite, which normally possess cation exchanging properties and which have in place of the normal exchangeable cation an onium base. Such onium base derivatives of the clays are the ammonium, phosphonium, oxonium, sulfonium, arsonium, stibonium and telluronium derivatives. The ammonium base clays are preferred Excellent results have been obtained by incorporating about 2% to 10%, and preferably 3%, by weight of dimethyldioctadecylammonium bentonite per weight of the total molding composition. This particular onium base derivative is supplied by the National Lead Company under the trade name "Bentone 34." This material has a specific gravity of 1.8 and is desirably of a small particle size, such as 0.05 to 0.1 microns in length.

The employment of these cation modified clays imparts a suspending action upon the high percentage of inorganic filler and prevents it from settling out before the molding composition has undergone an additional curing and has begun to solidify. This provides a homogenous resin casting.

It may be desirable to add additional ingredients to the molding composition to insure the production of a surface that is non-combustible. This property will not always be required, however, so that such additions are entirely optional. The addition of antimony trioxide and chlorinated paraffins even in small amounts is sufficient for this purpose, although other materials such as tricresyl phosphate may be used in place thereof.

The incorporation of an anti-foaming agent into the composition is highly important if the formation of air bubbles is to be minimized. Best results to date have been obtained with Dow-Corning Antifoam A. An amount of about 0.2% to 0.5% of the resin provides satisfactory results in most cases.

The sand filler (treated with a bonding agent in accordance with the invention having two types of reactive groups) is a critical component of the coating or molding compositions since it provides, in a sense, a diluting medium enabling savings of the more expensive polyester resins and also contributes very desirable properties of its own which are essential for a satisfactory surface. "Sand" as employed herein is intended to be used in its ordinary sense and includes loose material comprising small but easily distinguishable grains resulting from the disintegration of rocks. The grains are usually of between about one-sixteenth and two mm. in diameter. Consequently, the sand employed is not limited to silica sand, but may include other types of sand. Sand filler is desirable since it consists of rounded particles. Rounded particles will nest more closely together than will rough, irregular shaped particles. Rounded particles will slide past one another more readily than rough, irregular particles and are thus extremely beneficial in enhancing the flowability of the coating or molding composition in charging the mold. Because of this latter property they permit substantial savings in the amount of polyester resins required, as it becomes possible to increase the filler concentration and yet obtain excellent flowability. It is for this reason that sand is desired as a filler, for most sand particles are more smooth and rounded than are many of the other filler materials.

By employing sand having a gradation of particle sizes a number of advantages may be obtained. It is advantageous to be able to use a coating or composition having the greatest possible ratio of sand to resin. Not only are the resins substantially more expensive, but, as has been stated above, the sand contributes essential properties to a satisfactory cast surface.

Satisfactory results have been obtained when using sand having a maximum particle size of about a 20-mesh sieve.

In practice, it is desired to use particles having at least 2 general particle size classifications, one of which may be said to be of large size (in the order of 30–70 mesh) and another of small size (in the order of 100–325 mesh). It is desirable to employ a major proportion, and preferably 60% or more, by weight of the large size particles. One particularly successful gradation is one in which about 65% by weight of the sand is of approximately 40–70 mesh and 35% is of 70–140 or 70–200 mesh size. A gradation of 80% of the former mesh size and 20% of the latter is equally satisfactory.

It has been found that it is particularly desirable in the casting mixture to employ at least about 50% by weight of treated sand and preferably from 70% up to about 80%, and at least about 10%, and desirably more than 15%, by weight of the resin solids and polymerizable solvent, if one is to obtain the most satisfactory properties in the cast articles.

In order more clearly to disclose the nature of the present invention, specific examples illustrating the present invention will hereinafter be described. It should be understood, however, that this is done solely by way of example and is intended neither to delineate the scope of the invention nor limit the ambit of the appended claims. Parts are expressed in terms of parts by weight.

*Example 1*

A sand mix was first prepared by mixing the following sands.

86 lbs. crystal silica sand having the following approximate sieve analysis.

| Sieve sizes: | Approx. percentages |
|---|---|
| No. 40 | 38.0 |
| No. 50 | 41.0 |
| No. 70 | 14.0 |
| No. 100 | 4.0 |

22 lbs. banding sand having the following approximate sieve analysis.

Sieve sizes: Approx. percentages
No. 50 _____ 0.9
No. 70 _____ 20.0
No. 100 _____ 48.2
No. 140 _____ 20.9
No. 200 _____ 7.0
No. 270 _____ 2.5

The moisture content of the sand mixture was adjusted to a value of about 0.1% by weight of sand by adding sufficient water and mixing it with the sand. To this moistened sand mixture was added 0.25 parts of vinyltrichlorosilane by weight of sand and the mixture tumbled in a mixing drum at a temperature of 190° F. for one-half hour.

A coating composition was prepared by stirring in a mixing vessel just prior to the coating operation an initial mixture having the following composition:

A mixture of about 27% by weight of polyester resins made up of 3 parts of rigid type polyester resin (Paraplex P43, believed to be a condensation product of propylene glycol and dipropylene glycol in the ratio of 1 to 3 with phthalic anhydride and maleic anhydride in the ratio of 3 to 2) and 1 part of flexible type polyester resin (Paraplex P13, believed to be a condensation product of ethylene glycol and diethylene glycol with phthalic anhydride, maleic anhydride and adipic acid), 23% by weight of styrene monomer, 5% by weight of titanium dioxide as a pigment, and about 45% by weight of #325-mesh, asbestine, lbs. 25.5.

To this initial mixture were added the following:

Styrene monomer (solvent) _____lbs__ 16.5
Bentone 34 (dimethyldioctadecylammonium
  bentonite) _____lb__ 0.5
Methyl ethyl ketone peroxide (catalyst) _____cc__ 250
Manganese naphthenate (catalyst) _____lb__ 0.4

The resulting mix was agitated and to it was added promptly the treated sand mixture.

After mixing under the vacuum of 28 inches of mercury for about 15 minutes, the coating composition was ejected from the mixer at an air pressure of 30 lbs. per square inch and forced into empty pre-heated molds. To the molds were then added building units in the form of cement blocks. The molds with their coating composition and cement blocks were cured at 212° F. with live steam for 0.5 hours. The resulting coated block had an excellent adhesion of the coating to the block and was resistant to marring, scratching, thermal shock, staining, crazing, etc., and was waterproof and very decorative in appearance. After being in use for a substantial period of time, the coated surface was found to have excellent resistance to ink staining.

*Example 2*

A mixture of silica sand composed of about 65% by weight of particles of about 40 to 50 sieve size and 35% of about 100 sieve size was mixed with about 1% by weight of a mixture of vinyl silicon chlorides having one to three vinyl groups attached directly to silicon and the remaining valences attached to chlorine atoms. The mixture was tumbled in a drum mixer for about one-half hour at room temperature.

A resin composition containing the following ingredients was prepared:

Parts by weight
Rigid type polyester resin (Paraplex P-43) _____ 45
Flexible type polyester resin (Paraplex P-13) ____ 15
Methyl ethyl ketone peroxide (catalyst) _____ 2
Manganese naphthenate (catalyst) _____ 2
Titanium dioxide (pigment) _____ 12

Parts by weight
Resin coated calcium carbonate (Surfex, believed
  to be calcium carbonate coated with polydimethyl
  siloxane resin) (filler) _____ 19
Bentone 34 (dimethyldioctadecylammonium bentonite) _____ 2
Monomeric styrene (solvent) _____ 3

Total _____ 100

To the resin composition was added about one part of the treated silica sand for each part of the mixture and the resulting mixture added to molds.

The mold containing the above coating slurry was then placed in a chamber heated to a temperature of about 180° F. for 8 minutes. Approximately 3 to 8 minutes may be employed. At the same time the cinder block to be coated was pre-heated in the same or a different chamber to a temperature of about 180° F. At this stage the resin had become partially gelled. The pre-heated block was lowered face down into the mold until it was in contact with the resin in the mold. The mold containing the block and resin material was then heated at the same temperature (180° F.) for an additional period to give a total heating of about 40 minutes. At this time it was found the coating composition had cured sufficiently to become at least partly solid and well anchored to the face of the cinder block. The block in the mold was then subjected to further heating at a temperature of about 320° F. for 20 minutes to complete the curing of the thermosetting resins in the coating composition. The coated block was then removed from the mold and found to have a smooth, decorative face having excellent adhesion to the block and being highly resistant to marring, scratching, thermal shock, straining, crazing or the like. In addition, the coating had rendered this face of the block waterproof and provided a colored surface that was very pleasing and decorative in appearance. After being in use for a substantial period of time, the coated surface was found to have good resistance to ink staining.

*Example 3*

The mixture of silane treated sand and polyester resins produced in accordance with Example 1 was employed as a casting composition to produce a cast laundry tub as follows:

A two-face mold was first assembled to receive its charge of the casting composition. The mold was of such shape and size as to have a cavity having the shape of a conventional laundry tub 3 feet deep and 2 feet by 2 feet at the top with the sides tapering to a bottom of 2 feet long by 1¾ feet wide. The mold was assembled by placing the internal or male component in an upright assembled position so that the surface of the male face of the mold which corresponded to the internal surface of the bottom of the tub was placed facing upward. A metal drain pipe was positioned on top of the male mold face. Over the male mold face was placed the corresponding female mold face which conformed generally to the configuration of the male component and which provided a cavity which was of a uniform thickness of about ½ inch. That part of the female component of the mold which corresponds to the bottom of the tub was partially cut away so as not to interfere with the positioning of the metal drain pipe and to provide an orifice for pouring the resinous molding composition into the cavity of the assembled mold. The assembled mold was charged with the above molding composition promptly after its formation so that it did not have time to become polymerized. The charged mold was permitted to stand at room temperature for 48 hours, after which the mold was disassembled and the cast laundry tub removed.

The tub was found to be extremely hard and it possessed an extremely high compression and tensile strength and was eminently satisfactory. The surface of the tub was resistant to water and staining. The stain resistance was demonstrated by the fact that it was resistant to ink stains after long periods of service.

*Example 4*

A mixture of the following composition was prepared.

| | Oz. |
|---|---|
| Styrene | 227 |
| Pigment | 40 |
| Benzoyl peroxide | 20 |
| Flexible polyester resin | 114 |
| Rigid polyester resin (Paraplex P–43) | 227 |
| Silane treated graded sand blend of Example 1 | 684 |
| Colored ceramic coated roofing granules of about 30 mesh size | 57 |

(The flexible polyester resin was prepared from 443 oz. of maleic anhydride, 220 oz. of phthalic anhydride, 219 oz. of adipic acid, 341 oz. of ethylene glycol, and 584 oz. of diethylene glycol. The resulting mixture was diluted with 1809 oz. of styrene.)

The above mixture was produced by adding the silane treated graded silica sand to a mixture of the other ingredients and the resulting mixture stirred until a slurry was produced. The mixing container was evacuated to remove occluded air. The slurry was then poured into flat square molds of about 8 in. square having a draft of one-half inch until a layer of slurry lightly less than one-quarter inch, weighing about 1 pound, was introduced. The molds were then vibrated to distribute the contents of the molds evenly. While still being vibrated there was introduced into each mold about 1 pound of the same silane treated graded sand employed in producing the slurry. By continued vibration of the molds, the added dry sand was gradually wetted by the liquid resins of the slurry due to the wicking and settling action of the sand. The molds and their contents were then placed in an oven at 250° F. until the contents had hardened. The molds and their contents were removed from the oven, cooled, and the resulting cast floor tiles stripped from the molds. The resulting tiles were relatively warp-free and possessed satisfactory strength and attractive appearance. After being in use for a substantial period of time, the surface was fully resistant to ink staining.

*Example 5*

A mixture of the following composition was prepared:

| | | |
|---|---|---|
| Resin component (prepared by mixing 635 parts of a polyester resin [prepared from 433 parts of maleic anhydride, 220 parts of phthalic anhyhydride, 219 parts of adipic acid, 341 parts of ethylene glycol and 584 parts of diethylene glycol] with 176 parts of styrene monomer and 118 parts of Asbestine [fibrous magnesium sulphate]) | lbs | 25 |
| Styrene monomer | lbs | 12.45 |
| Bentone 34 | ozs | 8 |
| Blend of softening agents (2 parts by weight of ethyl acrylate for each part by weight of tricresyl phosphate) | lbs | 3.55 |
| Benzoyl peroxide | ozs | 12 |
| Manganese naphthenate dried (6% solution) | cc | 180 |
| Cobalt naphthenate drier (6% solution) | cc | 90 |
| Silane treated graded sand blend produced in accordance with Example 1 | lbs | 135 |

The above mixture was produced by adding the silane treated graded silica sand to a mixture of the other ingredients and the resulting mixture stirred until a slurry was produced. The mixing container was evacuated to remove occluded air. The slurry was then poured into flat molds. The molds were then vibrated to distribute the contents of the molds evenly. The molds and their contents were heated to about 180° F. for 8 minutes to gel the contents. Into each mold a preheated (180° F.) cinder block was placed. The molds and their contents were then placed in an oven at 250° F. until the polymeric coating on the blocks had hardened. The molds and their contents were removed from the oven, cooled, and the resulting faced cinder blocks stripped from the molds. The surfaces of the resulting faced blocks, after being in use for a substantial period of time, were fully resistant to ink staining.

*Example 6*

A mixture of the following composition was prepared:

| | | |
|---|---|---|
| Resin component (prepared by mixing 635 parts of a polyester resin [prepared from 433 parts of maleic anhydride, 220 parts of phthalic anhydride, 219 parts of adipic acid, 341 parts of ethylene glycol and 584 parts of diethylene glycol] with 176 parts of styrene monomer and 118 parts of Asbestine [fibrous magnesium sulphate]) | lbs | 25 |
| Styrene monomer | lbs | 11.35 |
| Bentone 34 | ozs | 8 |
| Blend of softening agents (equal parts by weight dimethyl itaconate and tricresyl phosphate) | lbs | 4.65 |
| Benzoyl peroxide | ozs | 12 |
| Manganese naphthenate drier (6% solution) | cc | 180 |
| Cobalt naphthenate drier (6% solution) | cc | 90 |
| Silane treated graded sand blend produced in accordance with Example 1 | lbs | 135 |

The above mixture was produced by adding the silane treated graded silica sand to a mixture of the other ingredients and the resulting mixture stirred until a slurry was produced. The mixing container was evacuated to remove occluded air. The slurry was then poured into flat molds. The molds were then vibrated to distribute the contents of the molds evenly. The molds and their contents were heated to about 180° F. for 8 minutes to gel the contents. Into each mold a preheated (180° F.) cinder block was placed. The molds and their contents were then placed in an oven at 250° F. until the polymeric coating on the blocks had hardened. The molds and their contents were removed from the oven, cooled, and the resulting faced cinder blocks stripped from the molds. The surfaces of the resulting faced blocks, after being in use for a substantial period of time, were fully resistant to ink staining.

It must, of course, be recognized that articles of various shapes and sizes may be produced in accordance with this invention by varying the type of mold.

The terms and expression which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A cast resin surface which is hard and abrasion resistant and resistant to staining over long periods of use, said surface being of a cured resinous composition of an ethylenically unsaturated polymerizable resin and sand particles, said sand particles comprising at least about 50% by weight of said composition, in which said sand particles and said cured resin are bonded to one another by a bonding agent comprising an alkylene substituted silane, and wherein the resinous composition also comprises a polymerizable solvent and a blend of tricresyl phosphate with a member selected from the class consisting of dimethyl itaconate and ethyl acrylate.

2. A masonry block having an integral molded facing layer of a composition comprising the reaction product of an ethylenically unsaturated alkyd resin and a polymerizable vinyl monomer and sand as a filler, the latter being in an amount of at least about 50% and not over 90% of the total of the resin, monomer and filler by weight, the composition of said facing layer permeating the adjacent surface of said block, said composition being cured to permanently interlock said facing layer and block and to form a facing layer having a hard, abrasion resistant surface substantially free of pits and pinholes and possessing elasticity enabling the layer to be resistant to peeling, crazing, staining and cracking due to blows and to differences in coefficients of expansion and contraction between the said block and the said facing thereon, said sand particles and said reaction product being bonded to one another by a bonding agent comprising an alkylene substituted silane, and wherein the polymerizable vinyl monomer also comprises a blend of tricresyl phosphate with a member selected from the class consisting of dimethyl itaconate and ethyl acrylate.

3. A cast resin surface as defined by claim 1 wherein the blend comprises up to about 20% by weight of the polymerizable solvent.

4. A masonry block as defined by claim 2 wherein the blend comprises up to about 20% by weight of the polymerizable vinyl monomer.

5. The method of providing a cast resin surface which is hard and abrasion resistant and resistant to staining over long periods of use which comprises polymerizing a resinous composition of an ethylenically unsaturated polymerizable resin and sand particles treated with a bonding agent comprising an alkylene substituted silane, said sand comprising at least 50% by weight of said composition, and wherein the resinous composition also comprises a polymerizable solvent and a blend of tricresyl phosphate with a member selected from the class consisting of dimethyl itaconate and ethyl acrylate.

6. The method of providing a cast resin surface which is hard and abrasion resistant and resistant to staining over long periods of use which comprises polymerizing a resinous composition of an ethylenically unsaturated polymerizable resin and sand particles treated with a bonding agent comprising an alkylene substituted silane, said sand comprising at least 50% by weight of said composition, and wherein the sand particles have a moisture content of from about 1/6 to about 3 times the weight of alkylene substituted silane employed as the bonding agent.

7. The method of providing a cast resin surface as defined by claim 6, wherein the sand particles have a moisture content of about 1/3 by weight of alkylene substituted silane employed as the bonding agent.

8. The method of providing a cast resin surface as defined by claim 6, wherein the sand particles have a moisture content of about 0.3% by weight of the sand prior to being treated with the bonding agent.

9. A method of claim 5 wherein the blend comprises up to about 20% by weight of the polymerizable solvent.

10. The method of producing a cast resin surface which is hard and abrasion resistant and resistant to staining over long periods of use which comprises treating sand particles with an alkylene substituted silane bonding agent, said sand particles having a moisture content of from about 1/6 up to 3 times the weight of alkylene substituted silane bonding agent employed, heating the treated sand particles at a temperature of at least about 160° F., polymerizing a composition comprising the thus treated sand particles and an ethylenically unsaturated polymerizable resin, said sand particles comprising at least about 50% by weight of said composition.

11. The method of claim 10 wherein the alkylene substituted silane bonding agent comprises between about 0.1 and 2% by weight of the sand particles.

12. The method of claim 10 wherein the sand particles comprise between about 50% and 90% by weight of said composition.

13. A masonry block having an integral molded facing layer of a composition comprising the reaction product of an ethylenically unsaturated alkyd resin and a polymerizable vinyl monomer and sand as a filler, the latter being in an amount of at least about 50% and not over 90% of the total of the resin, monomer and filler by weight, the composition of said facing layer permeating the adjacent surface of said block, said composition being cured to permanently interlock said facing layer and block and to form a facing layer having a hard, abrasion resistant surface substantially free of pits and pinholes and possessing elasticity enabling the layer to be resistant to peeling, crazing, staining and cracking due to blows and to differences in coefficients of expansion and contraction between the said block and the said facing thereon, said sand particles and said reaction product being bonded to one another by a bonding agent comprising between about 0.1% and 2% by weight of sand of an alkylene substituted silane, said ethylenically unsaturated alkyd resin and polymerizable vinyl monomer being present in an amount of from about 40 to 80 parts of the former for each 100 parts of combined weight of ethylenically unsaturated alkyd resin and polymerizable vinyl monomer.

References Cited

UNITED STATES PATENTS

| | | | |
|---|---|---|---|
| 2,751,775 | 6/1956 | Sergovic | 161—43 |
| 2,817,619 | 12/1957 | Bickel et al. | 161—195 |
| 3,006,875 | 10/1961 | Liberthson et al. | 117—123 |
| 3,030,234 | 4/1962 | McClinton | 117—123 |
| 3,194,724 | 7/1965 | Sergovic | 161—158 |

ALEXANDER WYMAN, *Primary Examiner.*

MORRIS SUSSMAN, *Assistant Examiner.*

REEXAMINATION CERTIFICATE (48th)

United States Patent [19]

Sergovic

[11] B1 3,328,231

[45] Certificate Issued Jan. 25, 1983

[54] METHOD OF PRODUCING CAST SURFACES AND PRODUCT OBTAINED THEREBY

[75] Inventor: John A. Sergovic, Severna Park, Md.

[73] Assignee: The Burns & Russell Company of Baltimore City, Baltimore, Md.

Reexamination Request
No. 90/000,072, Sep. 18, 1981

Reexamination Certificate for:
Patent No.: 3,328,231
Issued: Jun. 27, 1967
Appl. No.: 542,368
Filed: Apr. 13, 1966

Certificate of Correction issued Feb. 20, 1968

Related U.S. Application Data

[63] Continuation of application Ser. No. 72,506, Nov. 29, 1960.

[51] Int. Cl.³ .............................. B32B 13/12; E04C 2/04
[52] U.S. Cl. ............................ 428/451; 52/309.17; 52/612; 156/242; 428/78; 428/317.9; 428/331; 428/454; 428/703; 523/506
[58] Field of Search .................................................. none

[56] References Cited

U.S. PATENT DOCUMENTS

| 2,705,206 | 3/1955 | Wagner | 117/100 |
|---|---|---|---|
| 2,742,378 | 4/1956 | Te Grotenhuis | 117/76 |
| 2,751,369 | 6/1956 | Te Grotenhuis | 260/41 |
| 2,752,275 | 6/1956 | Raskin et al | 154/45.9 |
| 2,814,836 | 12/1957 | Russell | 18/60 |
| 2,841,566 | 7/1958 | Grotenhuis | 260/17.4 |
| 2,859,198 | 11/1958 | Sears | 260/37 |
| 3,030,234 | 4/1962 | McClinton | 117/123 |
| 3,078,249 | 2/1963 | Russell | 523/216 |
| 3,080,253 | 3/1963 | Dietz | 427/181 |
| 3,193,429 | 7/1965 | Yeager | 156/329 |

FOREIGN PATENT DOCUMENTS

| 528080 | 7/1956 | Canada. |
|---|---|---|
| 556193 | 4/1958 | Canada. |

OTHER PUBLICATIONS

E. G. Rochow, An Introduction to the Chemistry of the Silicones, 2nd Ed., John Wiley & Sons (1951).

*Primary Examiner*—Ellis P. Robinson

*Attorney, Agent, or Firm*—Charles B. Smith; Stephen P. Gilbert

[57] EXEMPLARY CLAIM

1. A cast resin surface which is hard and abrasion resistant and resistant to staining over long periods of use, said surface being of a cured resinous composition of an ethylenically unsaturated polymerizable resin and sand particles, said sand particles comprising at least about 50% by weight of said compostion, in which said sand particles and said cured resin are bonded to one another by a bonding agent comprising an alkylene substituted silane, and wherein the resinous composition also comprises a polymerizable solvent and a blend of tricresyl phosphate with a member selected from the class consisting of dimethyl itaconate and ethyl acrylate.

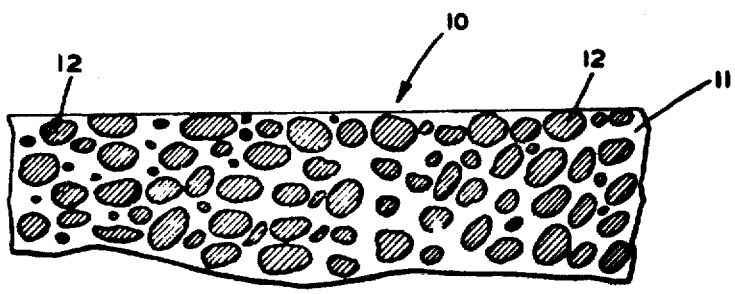

REEXAMINATION CERTIFICATE ISSUED UNDER 35 U.S.C. 307.

THE PATENT IS HEREBY AMENDED AS INDICATED BELOW.

Matter enclosed in heavy brackets appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–5 and 9 is confirmed.

Claim 11, having been finally determined to be unpatentable, is cancelled.

Claims 6, 10 and 13 are determined to be patentable as amended:

6. The method of providing *a masonry block with* a cast resin surface which is hard and abrasion resistant and resistant to staining over long periods of use, which *method* comprises polymerizing *on a masonry block* a resinous composition of an ethylenically unstaurated polymerizable resin and sand particles treated with a bonding agent comprising an alkylene substituted silane, *the silane used in an amount equal to from about 0.1 to 2% by weight of the sand particles,* said sand comprising at least 50% by weight of said composition, [and wherein] the sand particles [have] *having* a moisture content of from about ⅙ to about 3 times the weight of alkylene substituted silane employed as the bonding agent, *and essentially all the sand particles being from about one-sixteenth to two millimeters in diameter.*

10. The method of producing *on a masonry block* a cast resin surface which is hard and abrasion resistant and resistant to staining over long periods of use, which *method* comprises treating sand particles with an alkylene substituted silane bonding agent, *the silane used in an amount equal to from about 0.1 to 2% by weight of the sand particles and* said sand particles having a moisture content of from about ⅙ up to 3 times the weight of alkylene substituted silane bonding agent employed, heating the treated sand particles at a temperature of at least about 160° F., polymerizing *on a masonry block* a composition comprising the thus treated sand particles and an ethylenically unsaturated polymerizable resin, said sand particles comprising at least about 50% by weight of said composition *and essentially all the sand particles being from about one-sixteenth to two millimeters in diameter.*

13. A masonry block having an intergral molded facing layer of a composition comprising the reaction product of an ethylenically unsaturated alkyd resin and a polymerizable vinyl monomer and sand as a filler, the latter being in an amount of at least about 50% and not over 90% of the total of the resin, monomer and filler by weight, the composition of said facing layer permeating the adjacent surface of said block, said composition being cured to permanently interlock said facing layer and block and to form a facing layer having a hard, abrasion resistant surface substantially free of pits and pinholes and possessing elasticity enabling the layer to be resistant to peeling, crazing, staining and cracking due to blows and to diffferences in coefficients of expansion and contraction between the said block and the said facing thereon, said sand particles and said reaction product being bonded to one another by a bonding agent comprising between about 0.1% and 2% by weight of sand of an alkylene substituted silane, *said silane being bonded to the sand using a moisture content on the sand of from about ⅙ up to 3 times the weight of the silane,* said ethylenically unsaturated alkyd resin and polymerizable vinyl monomer being present in an amount of from about 40 to 80 parts of the former for each 100 parts of combined weight of ethylenically unsaturated alkyd resin and polymerizable vinyl monomer *and essentially all the sand particles being from about one-sixteenth to two millimeterrs in diameter.*

Claims 7, 8 and 12, dependent on amended claims, are determined to be patentable.

* * * * *